United States Patent [19]

Mickelson

[11] Patent Number: 4,658,609
[45] Date of Patent: Apr. 21, 1987

[54] UNIVERSAL JOINT LOCK
[75] Inventor: Thorwald J. Mickelson, Excelsior, Minn.
[73] Assignee: Transport Security Inc., Minneapolis, Minn.
[21] Appl. No.: 404,275
[22] Filed: Aug. 4, 1982
[51] Int. Cl.[4] .................. B60R 25/02; E05B 65/12
[52] U.S. Cl. .................................. 70/183; 70/212; 70/237; 70/253
[58] Field of Search ............ 70/14, 57, 58, 181, 70/182, 183, 187, 237, 253; 403/12, 378, 379; D8/330, 343, 69, 316, 313, 97; D7/43

[56] References Cited
U.S. PATENT DOCUMENTS

| D. 276,888 | 12/1984 | Jaeger | D8/330 |
| 112,910 | 3/1871 | Essex | 70/183 |
| 1,426,534 | 8/1922 | Baker | 70/253 |
| 1,502,933 | 7/1924 | Allen | 70/253 |
| 1,520,600 | 12/1924 | Robbins | 70/253 |
| 2,700,289 | 1/1955 | Morgan | 70/14 |
| 2,846,864 | 8/1958 | Polston | 70/181 |
| 4,538,435 | 9/1985 | Romero | 70/183 |

Primary Examiner—Robert L. Wolfe
Attorney, Agent, or Firm—Hugh D. Jaeger

[57] ABSTRACT

A member formed of saw and bolt cutter resistant, hardened steel which is insertable between the arms of the U-joint of a truck steering system and locked in place by one or more padlocks. So installed, the member prevents steering of the truck, thereby preventing theft of the truck.

1 Claim, 7 Drawing Figures

U.S. Patent  Apr. 21, 1987  4,658,609
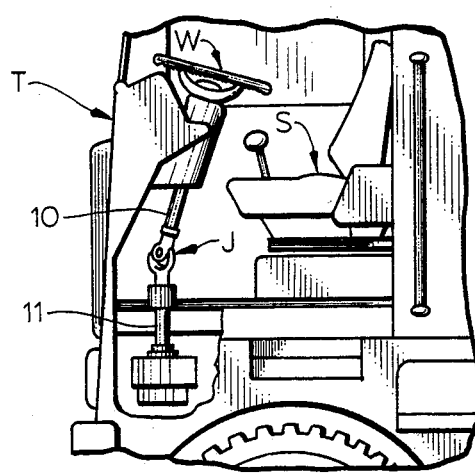
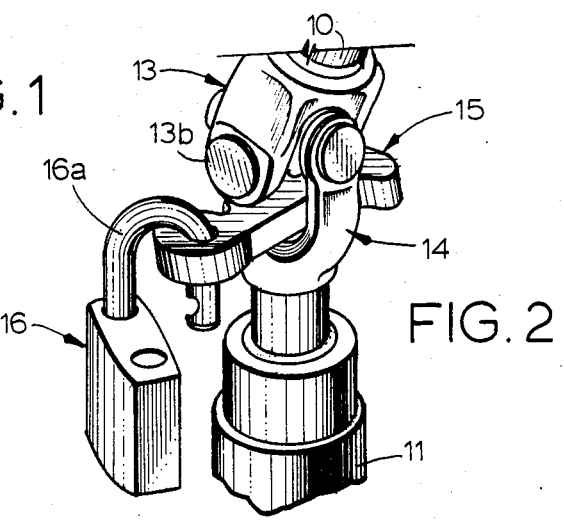
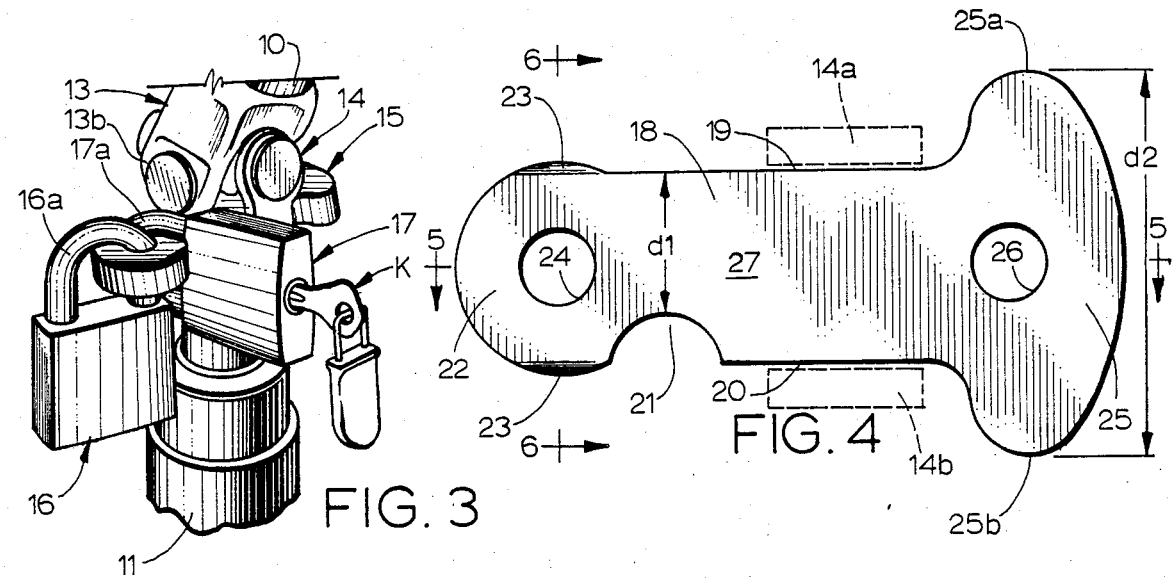
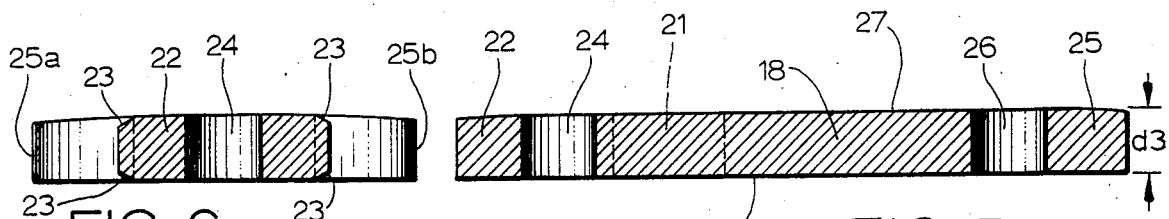
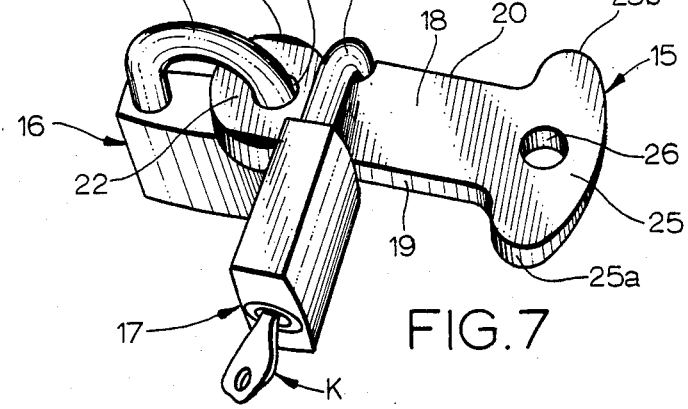

UNIVERSAL JOINT LOCK

Theft of vehichles of all kinds has always been a problem, and the frequency thereof has markedly increased as the economic situation worsens.

This is particularly true with respect to trucks, and the solution of the problem has heretofor been virtually unsolvable, except for the usual procedures of locking the doors and windows of the cab. However, these conventional procedures are ineffective against the serious thief who can easily pick a lock or break a window.

Therefore, the primary objective of this invention is to provide means for inhibiting movement of the steering mechanism of an automotive vehicle, especially trucks, to discourage and prevent the theft thereof.

Another object is to provide means for inhibiting the steering movement of an automotive vehicle which incorporates a universal joint as a part of its steering mechanism.

Still another object is to provide means for locking against movement the steering mechanism of a truck which has a universal joint incorporated therein by inhibiting movement between the cooperating yokes of the universal joint.

Another object is to inhibit steering movement of an automotive steering mechanism having a universal joint forming an integral part thereof by relatively inexpensive, easy to operate means comprising a member removeably insertable between the opposing yokes of the universal joint to inhibit movement therebetween, and means for locking said member in place so that it cannot be removed by anyone other than the owner or user, such as vandals, thieves or mischievious children.

These and other uses, objects and advantages will be readily apparent from a review of the attached drawings and a reading of the following description which relates to said drawings, and in which drawings:

FIG. 1 is a broken away side elevational view of a portion of a truck tractor of the Cab-Over-Engine type, illustrating one type of steering mechanism incorporating a universal joint to which this invention is applicable.

FIG. 2 is a perspective view of an enlarged scale of the universal joint of FIG. 1, with the lock mechanism of this invention installed therein, utilizing a single padlock.

FIG. 3 is a perspective view similar to FIG. 2 illustrating the use of two padlocks for extra protection.

FIG. 4 is a top plan view of the locking bar itself.

FIG. 5 is a longitudinal sectional view of the locking bar taken along the lines 5—5 of FIG. 4.

FIG. 6 is a cross-sectional view of the locking bar taken along the line 6—6 of FIG. 4.

FIG. 7 is a perspective view of the locking bar with two padlocks mounted thereon.

Referring to the drawings, and initially to FIG. 1, said Figure shows a typical Cab-Over-Engine truck tractor T having an operation cab which includes a seat S and a steering wheel W. The steering wheel operates a steering mechanism which includes an upper shaft 10 rotatably driven by the steering wheel W and a lower shaft 11 which are connected to each other for relative movement therebetween by a universal joint indicated in its entirety by J which includes an upper yoke unit 13 connected to and operated and driven by upper shaft 10 and a lower yoke unit 14 connected to lower shaft 11 for driving or turning same, the lower shaft 11 through its normal turning movement causing the steering movement of the vehicles ground engaging wheels.

Prior to this invention, this type of vehicle has been extremely vulnerable to theft, and the steering lock mechanisms conventionally installed in modern day passenger cars are not readily adaptable to this type of truck steering mechanism, and no locking mechanism for the steering mechanism is provided by the truck or tractor manufacturer as standard equipment.

The invention involves the use of movement inhibiting means such as the locking bar 15 which is a rigid elongate member formed of saw-resistant hardened steel which is adapted to be inserted between the two yoke units 13 and 14 and then locked in place by means of locking means such as a single padlock 16, or with the aid of a second or extra padlock 17. Where so installed, the locking bar 15 inhibits or totally prevents relative movement between the two yoke units 13 and 14, thereby preventing any significant or useful steering of the vehicle by manipulation of the steering wheel W.

The locking bar 15 may be formed in any convenient manner, but in one preferred form it is the result of a stamping operation.

The locking bar has a main elongate body portion 18 which having straight parallel opposing sides 19 and 20, the distance between 19 and 20 representing the main width of the locking bar which is installed between the opposing upstanding yoke arms 14a and 14b of the lower yoke unit. Said width of the bar may vary according to the types of universal joints in which it is to be installed, but in a typical preferred embodiment the preferred embodiment is $1\frac{1}{4}$ inches. In any event, the width is such as to fit between the yoke arms 14a and 14b, and preferably fairly snugly to minimize the amount of play the locking bar might be subjected to, and yet narrow enough to permit easy insertion of the locking bar, it being understood that the locking bar is inserted while the yoke units 13 and 14 jointed together.

Side 20 of the bar has a concave slot 21 formed therein for receiving the shackle 17a of another locking means such as padlock 17. The slot 21 is of such depth that the distance d1 between its deepest part and side 19 approximates the distance between the outermost part of the shackle 17a and the main body or box 17b of the padlock 17 when it is locked in place, so that padlock 17 cannot be slid off or otherwise removed from the locking bar.

The bar 15 has a circular leading end or head 22 which is also capable of passing between the yoke arms 14a and 14b, and which in one preferred embodiment has a widthwise diameter slightly larger than the main width between sides 19 and 20.

The four edges or corners 23 of head 22 are cut off at a slant or chamfered or beveled to facilitate insertion and removal, with the chamfering extending logitudinally with respect to the locking bar. The chamfered corners are best seen in FIG. 6.

The head 22 has a circular opening 24 formed therein for receiving the shackle 16a of padlock 16 to lock the locking bar in place.

At the other end of the locking bar a generally ovate locking or movement limiting head 25 is provided, which is substantially larger than the main width of the locking bar 15, and larger than the distance between the yoke arms 14a and 14b, so that it cannot pass therebetween. In a typical preferred embodiment that maximum width d2 of head 25 represented by its outer ends 25a and 25b, is about 2½ inches, this enlarged head giving the locking bar a generally "T" shaped appearance when seen from above, as in FIG. 4, and also gives it an appearance somewhat similar to a key. Thus, the main shaft 18 is smaller in width than both heads 22 and 25.

The head 25 is provided with a circular opening 26 for receiving a chain (not shown) or some other flexible element to enable the bar to be chained or tethered to the doghouse or some other part of the tractor to prevent its being lost and to keep it conveniently available for use at all times. Head 25 limits the longitudinal movement of bar 15 in a direction in which head 25 trails and head 22 leads.

The locking bar 15 has a substantially flat top surface 27 and a substantially flat bottom surface 28 which are substantially parallel opposed surfaces, with the distance d3 therebetween representing the thickness of the locking bar, which thickness in a typical preferred embodiment being on the order of 7/16 inches. In some embodiments, the top surface 17 may be very slightly convexly curved as seen in cross-section, and the bottom surface 28 may be very slightly concavely curved, when viewed in cross-section.

This thickness d3 must be such that when installed and in place it prevents any significant relative movement between the yoke sections 13 and 14, and more specifically the movement of the upper yoke 13 relative to the lower yoke 14.

In operation, the operator of the vehicle, in order to prevent theft thereof, simply inserts the head 22 of the bar between the yoke arms 14a and 14b of the lower yoke section 14, and under the yoke arms 13b of the upper yoke unit 13 and slides it longitudinally until the opening 24 extends sufficiently far out on the side opposite head 25 so that padlock 16 can be installed in opening 24 if only a single padlock is used. If two padlocks are to be used, or if only one padlock such as 17 is to be used in conjunction with slot 21, then the locking bar 15 must be pushed far enough through to enable the shackle 17a of padlock 17 to be installed around the width of the bar in the slot 21.

Thus, it is self-evident that the locking bar 15 must be long enough for the slot 21 to clear the yoke arm 13b of the upper yoke section to permit lateral installation of a padlock in slot 21.

Once locked, the padlocks stay that way until opened by a suitable key K. There may be a single key usable in both padlocks, or they may each have their own key.

When the locking bar is installed, the inner edges of the head 25 may or may not abut with the yoke arms 14a and 14b, but the head will not pass between yoke arms 14a and 14b, and therefore the locking bar is prevented from being pulled longitudinally through the universal joint by head 25.

The padlocks prevent the locking bar from being pushed or longitudinally with the head 25 leading and head 22 following, because of the padlocks engagement with either or both of the yoke sections.

Padlocks such as those sold under the tradename Abloy are preferred, since both sides of thin shackles must be cut before they can be removed from the locking bar. Thus, the potential thief must cut each shackle twice in order to remove the locking bar and free the universal joint and the steering mechanism.

It is to be understood that a single padlock installed either vertically in the locking bar in opening 24 or horizontally in slot 21 will successfully lock the bar 15 in place. Two padlocks are used simply to double the difficulty of releasing the locking bar 15.

Thus, the illustrated and described locking mechanism of this invention provides protection from theft when the truck is idled for extended periods during cold weather, when in truck stop line-ups, when parked in motel parking lots, when parked for food and fuel stops, and when parked in dealer and fleet parking lots.

Since the invention prevents stealing of the tractor, it also protects the trailer attached to the tractor and any cargo carried therein.

Although the invention has been illustrated as used with a truck tractor, it has broader applicability, being usable also with farm and construction equipment which uses a universal joint between the steering wheel and the steering unit, either power or mechanical for the vehicle or equipment directional means such as wheels.

In a broader context, the invention is applicable to any system involving a universal joint where it is desirable to prevent relative movement between the yoke section of said joint for whatever reason.

To give some idea of the importance of this invention, the FBI reports that approximately 19,000 tractors and 20,000 trailers are stolen each year, and this reflects only vehicles engaged in inter-state commerce, and does not reflect the number stolen in intra-state traffic.

Thus, by simply installing the locking bar 15 between the yoke sections of a universal joint and locking it in place, relative movement between the yoke sections is prevented, the universal joint ceases to function, and if it is part of a vehicle steering mechanism, it prevents steering of the vehicle, and thereby prevents stealing thereof.

To function properly, the ends of the upper yoke arms 13b must be substanitially parallel with each other and substantially equidistant from the curved bight portion of the lower yoke section, when the locking bar is installed. When so positioned, the wheels of the tractor are substantially straight, so that the vehicle is restricted to forward and reverse operation only when the locking bar is in place.

It will also be noted that it is desirable to use padlocks which are highly resistant to cutting with bolt cutters or saws, so that it is hard to cut both the padlocks and the locking bar.

It will also be noted that the head 25 is wider than the distance between the yoke arms 14a and 14b and is adapted to engage said yoke arms, and when so engaged limits and prevents further movement of the lock bar 15 in one direction, namely the installational direction in which the head 22 leads and head 25 follows.

It will, of course, be understood that various changes may be made in the various parts and dimensions referred to and illustrated herein, without departing from the scope of this invention.

I claim:

1. In combination with a system having first means and second means operatively connected by a universal joint embodying cooperating yoke sections;
   a. movement inhibiting means insertable between said yoke sections, said movement inhibiting means when installed between said yoke sections inhibiting relative movement between said yoke sections, and lock means for holding said inhibiting means in movement inhibiting position between said yoke sections;

b. said movement inhibiting means comprises a rigid elongated member insertable between said yoke sections, located adjacent one end of said member, second means forming a part of said member adapted to engage at least one of said yoke sections and prevent longitudinal movement of said member when so engaged, and third means adjacent the other end of said member, and connected therewith adapted to engage said lock means to hold said member in said movement inhibiting position;

c. fourth means adjacent to the other end of said member and forming a part thereof adapted to engage said lock means to hold said member in said movement inhibiting position;

d. said fourth means includes a slot formed in said member communicating with one edge portion of said member and adapted to receive the shackle of a padlock spanning the width of said member; and, e. said member has a second enlarged head portion at the end opposite said first enlarged head portion, said second enlarged head portion being wider than the main body portion of said rigid member located intermediate said first and second enlarged head portions, and said second enlarged head portion being adjacent said slot and adapted to prevent removal of a padlock when the shackle thereof is installed in said slot in locking engagement with said member.

* * * * *